No. 733,965. PATENTED JULY 21, 1903.
G. C. HORST.
CONVEYER.
APPLICATION FILED NOV. 17, 1902.
NO MODEL.

Witnesses.

Inventor.
George C. Horst,
By H. H. Bliss,
Atty.

No. 733,965. Patented July 21, 1903.

UNITED STATES PATENT OFFICE.

GEORGE C. HORST, OF COLUMBUS, OHIO, ASSIGNOR TO JOSEPH A. JEFFREY, OF COLUMBUS, OHIO.

CONVEYER.

SPECIFICATION forming part of Letters Patent No. 733,965, dated July 21, 1903.

Application filed November 17, 1902. Serial No. 131,684. (No model.)

*To all whom it may concern:*

Be it known that I, GEORGE C. HORST, a citizen of the United States, residing at Columbus, in the county of Franklin and State of Ohio, have invented certain new and useful Improvements in Conveyers, of which the following is a specification, reference being had therein to the accompanying drawings.

This invention relates to improvements in conveyers of the class constructed with cable-chains and scraping devices or flights secured thereto for the purpose of engaging with and propelling material along troughs or equivalent supports. The object is to provide such chains with scrapers or flights of the simplest possible form which can be made at a minimum of cost and with parts such as to permit ready replacing and interchanging when necessary.

Figure 1:
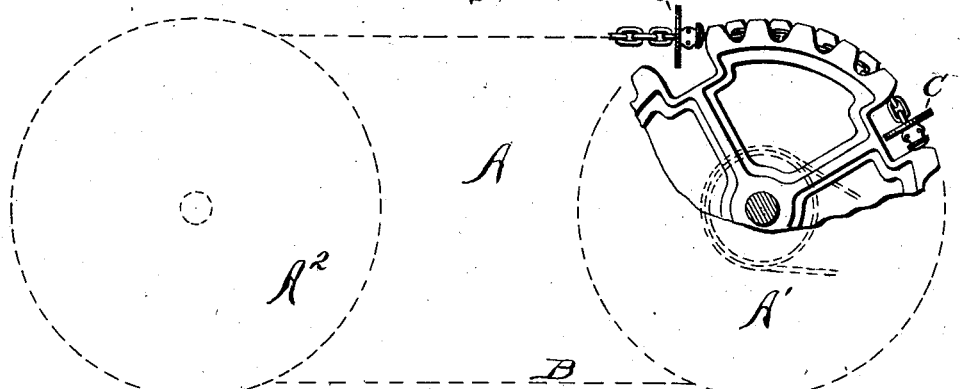
Figure 2:
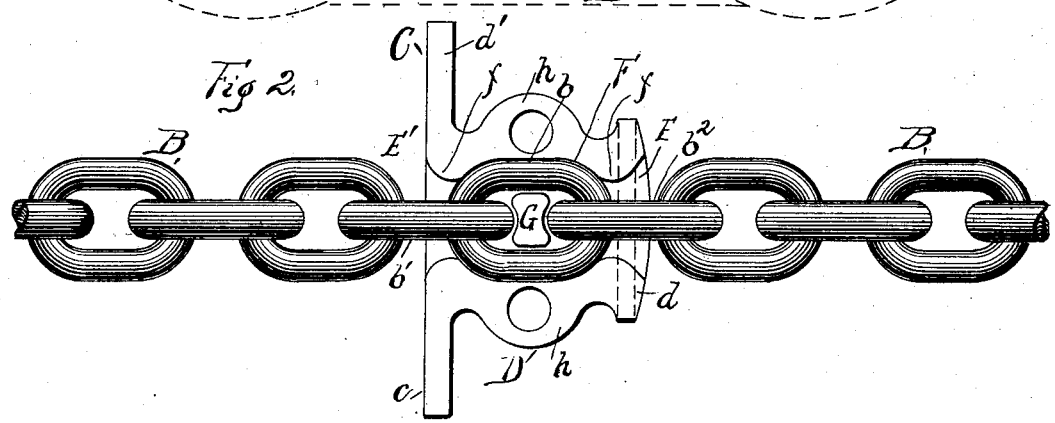
Figure 3:
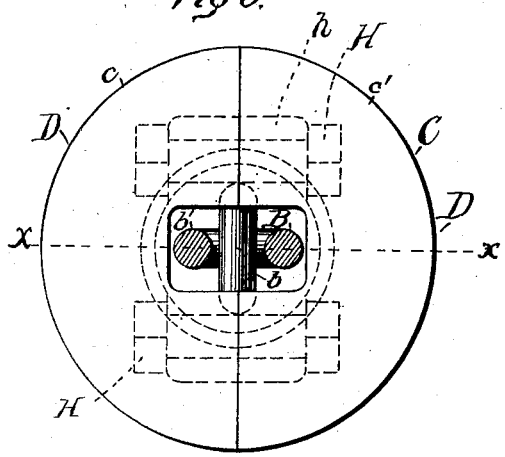
Figure 4:
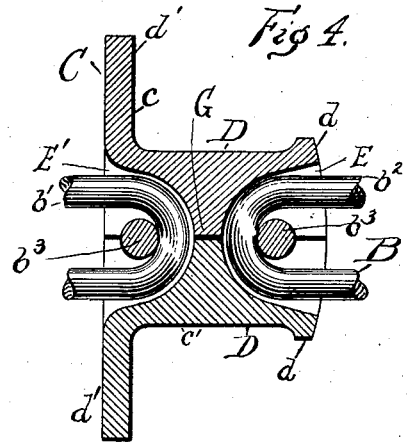

Figure 1 is a side view of a conveyer mechanism, showing parts sufficient to illustrate the manner of applying my invention. Fig. 2 is a view on a larger scale of a section of the cable-chain, together with one of the parts of a flight or scraper. Fig. 3 is a face view of a flight, showing the cable-chain in section. Fig. 4 is a cross-section on the line $xx$, Fig. 3.

In the drawings, A indicates a conveyer as a whole, parts thereof being indicated by dotted lines in Fig. 1. It is formed of an endless cable-chain B, supported upon the wheels $A'$ $A^2$. As concerns the wheels upon which the conveyer is mounted and by means of which it is propelled and guided, there can be modification.

The chain B is of the well-known cable type—that is to say, one in which the links are formed of round wrought rods, each link being a counterpart of the others, and each being articulated to the two adjacent ones in such way that it lies in a plane at right angles to their plane. It is well known that for many reasons it is desirable to employ chains of this sort because of their great strength and flexibility. Numerous attempts have been made to provide them with scraping devices or flights of such sort that they can be readily attached and detached. One of the purposes of the present invention is to provide flight or scraper attachments of such nature that the flexibility of the chain will not be interfered with, so that it can readily pass around wheels of relatively small diameter and at the same time have provision made for firm union of the flight or scraper at its point of attachment. For convenience in description I have indicated one of the links by $b$ and the two that are adjacent thereto by $b'$ $b^2$, these being the three links which are immediately adjacent to one of the scrapers or flights. The latter, each indicated as a whole by C, are each made in two simple halves $c$ $c'$, which are duplicates of each other. Their plane of contact or separation is the central plane of the link $b$. Each flight half is formed with a central or body part D, a wheel-engaging hub-like part $d$, and a laterally-expanded flange or disk half $d'$. The hub part $d$ has a flared opening E, and at the opposite end there is a flared opening $E'$. The interior of the body is formed with a cavity F, the exterior line of which conforms to one-half of the exterior surface of the link $b$, the metal being extended inward, as shown at $f f$, at the ends of this cavity. At the center there is a stud or projection G. As above stated, the two halves $c$ $c'$ are similar to each other with respect to the parts just described, so that when they are brought together around one of the links $b$ they inclose it, the link being situated in a cavity which locks it in position. The dimensions of the sockets or mouths at E E' are such that they can respectively receive the end of the adjacent links $b'$ $b^2$, and as these sockets are flaring in the way described and shown these latter links have a freedom of articulating movement, and the flexibility of the chain is in no wise affected by the attachment C. The central studs G G are situated so as to be transverse to the plane of the link $b$, the end parts $b^3$ of this link $b$ serving as pintles or hinge-pins around which the adjacent links $b'$ $b^2$ can freely articulate.

The two halves of the flight are secured together by means of the bolts at H, which pass through the ears $h$.

In case of breakage of either part of the flight it is merely necessary to remove the broken section and substitute a new one. The outer surface of the hub part $d$ is curved as shown at $d'$, so as to fit against and roll upon the tooth-like portion of the wheel which imparts motion to the conveyer.

What I claim is—

The herein-described flight and attachment for a cable-chain formed with links as at $b$ $b'$ $b^2$, having the two halves $c$ $c'$ each formed with a semicavity F adapted to receive a link $b$ and flaring sockets or mouths E E' to receive the adjacent links $b'$ $b^2$ and permit their free articulation, the hub-like part $d$ at one end and the laterally-expanded disk-like flight C at the other, the two parts of the flight being separable on the plane of the link $b$, substantially as set forth.

In testimony whereof I affix my signature in presence of two witnesses.

GEORGE C. HORST.

Witnesses:
CHAS. W. MILLER,
ALICE PRICE.